US005386501A

United States Patent [19]

Nguyen

[11] Patent Number: 5,386,501

[45] Date of Patent: Jan. 31, 1995

[54] DEVICE FOR FORMING A CIRCULAR IMAGE ON A DISPLAY SCREEN

[75] Inventor: Ahn D. Nguyen, Eindhoven, Netherlands

[73] Assignee: U.S. Philips Corporation, New York, N.Y.

[21] Appl. No.: 973,445

[22] Filed: Nov. 9, 1992

[30] Foreign Application Priority Data

Nov. 12, 1991 [EP] European Pat. Off. ........... 91202932

[51] Int. Cl.[6] .............................................. G06F 15/60

[52] U.S. Cl. .................................................... 395/140

[58] Field of Search ............... 395/133, 140, 142, 164, 395/166; 345/131, 203

[56] References Cited

U.S. PATENT DOCUMENTS 5,265,197 11/1993 Kondo ................................ 395/120

*Primary Examiner*—Phu K. Nguyen
*Attorney, Agent, or Firm*—Jack D. Slobod

[57] ABSTRACT

A display screen (3) is scanned in a pattern of parallel image lines, each extending in conformity with the equation $y=Y_L$ in a rectangular system of coordinates associated with the display screen, $Y_L$ having a different value for each image line, and an output signal is formed at any instant at which an image line intersects the circumference of a desired circle (31) to be formed bounding the image. The device includes a first store (13) for coordinates $X_r$, $Y_r$ of at least one quadrant of a reference circle (27) having a predetermined centre $M_0(X_0, Y_0)$ and a predetermined radius $R_r$, the $Y_r$ coordinate acting as an address, the associated $X_r$ coordinate being stored at each address $Y_r$, respectively; an arithmetic device (15) for calculating the coordinates X', Y' of the desired circle (31) from the coordinates $X_r$, $Y_r$ of the reference circle (27) and given values of the radius R and the coordinates $X_1$, $Y_1$ of the centre $M_1$ of the desired circle; a second store (19) for the calculated values of X' and Y', the calculated values Y' acting as addresses, the associated values of X' being stored at each address Y'; and a comparator (23) for comparing, during the scanning of the display screen (3), the x-coordinates followed during the formation of each image line $y=Y_L$ m with the value X' associated with $Y'=Y_L$ and stored in the second store, and for generating an output signal at the instant at which $x=X'$.

6 Claims, 1 Drawing Sheet

DEVICE FOR FORMING A CIRCULAR IMAGE ON A DISPLAY SCREEN

BACKGROUND OF THE INVENTION

1. Field of the Invention

The invention relates to a device for forming a an image bounded by a circle of radius R on a display screen, by scanning the display screen in a pattern of parallel image lines and for forming an output signal at any instant at which an image line intersects the circumference of the circle to be formed.

2. Description of the Related Art

A device of this kind may form part of, for example an X-ray apparatus comprising an image intensifier, a television camera for picking up the image formed on the exit screen of the image intensifier, and a monitor for displaying the image picked up by the camera, for example as described in GB-A-2 035 749. Because the exit screen of the image intensifier usually has a circular shape and the display screen of the monitor has a rectangular shape, it is desirable to darken the part of the display screen outside the image of the exit screen, so that the observation of this image, containing the desired information, is not impeded by disturbing light. This can be readily realised by forming, on the display screen, an image of a black surface with a circular opening having the same dimensions as the exit screen, said surface being positioned so that the image of the exit screen is coincident with the opening in the surface. Moreover, it is often desirable to indicate a circular measuring region in an object displayed on the display screen, for which purpose a circular image is superposed on the image of the object. This can be carried out during X-ray examinations as well as during various other measurements (for example, ultrasound examinations for medical diagnosis or testing of materials). In all cases it is desirable to generate a circular image which can be added to the actual image displayed on the display screen. This image was generated thus far using analog means. This operation requires a comparatively large amount of time, which is disturbing notably when frequently a new circle (for example, having a different radius or a different position) is to be generated.

SUMMARY OF THE INVENTION

It is an object of the invention to provide a device of the kind set forth which is capable of generating an image of a desired circle very quickly and which is comparatively inexpensive. To achieve this, the device in accordance with the invention is characterized in that it also comprises:

a) first storage means for storing the coordinates $X_r$, $Y_r$ of at least one quadrant of a reference circle having a predetermined centre $M_0(X_0, Y_0)$ and a predetermined radius $R_r$, one of the coordinates acting as an address, the associated coordinate $X_r$, $Y_r$ being stored at each address $Y_r$, $X_r$, respectively;

b) arithmetic means for calculating the coordinates X' and Y' of the desired circle from the coordinates $X_r$, $Y_r$ of the reference circle and given values of the radius R and the coordinates $X_1$, $Y_1$ of the centre $M_1$ of the desired circle;

c) second storage means for storing the calculated values of X' and Y', the y-coordinates acting as addresses, the associated values of X' being stored at each address Y';

d) comparison means for comparing, during the scanning of the display screen, the x-coordinates followed during the formation of each image line $y=Y_L$ through a pixel with the values X' associated with $Y'=Y_L$ and stored in the second storage means, and for generating an output signal at the instant at which $x=X'$.

The invention is based on the recognition of the fact that only the standard arithmetical functions (addition, subtraction, multiplication and division) are required to calculate the coordinates of a circle having a desired radius R and the same centre $M_0$ as the reference circle; the same holds good for shifting the circle thus found across the display screen when a circle having a centre other than $M_0$ is desired. Calculations requiring only the standard functions can be very quickly executed, for example by means of a simple, inexpensive microprocessor.

The calculation of the coordinates of the reference circle requires not only the standard functions, but also the root extraction function which is much more time-consuming. However, this calculation need be executed only once, for example when the device is switched on. The reference circle data thus always remain available in the first storage means. A preferred embodiment of the device in accordance with the invention in which the reference circle data may be permanently present is characterized in that the first storage means comprise a non-volatile memory. The non-volatile memory may be, for example an EPROM.

The execution of the necessary calculations by the arithmetic means can be performed in various ways. One embodiment of the device in accordance with the invention in which the calculation is particularly simple and fast, is characterized in that the arithmetic means are operative to calculate the coordinates X and Y of an auxiliary circle, having the same centre $M_0(X_0, Y_0)$ as the reference circle and a radius R, by executing the following calculations for each value of Y between O and R in said quadrant:

1) calculation, for each value of Y, of an associated value of $Y_r$ in conformity with the formule: $Y_r=(R_r/R)*Y$;

2) reading of the value $X_r$ stored at the address $Y_r$ in the first storage means;

3) calculation of the value of X associated with Y in conformity with the formule: $X=(R/R_r)*X_r$;

4) calculation, if necessary, of the corresponding values of X and Y in the other quadrants by mirroring the values of X relative to the line $x=X_0$ and by mirroring the values of Y relative to the line $y=Y_0$.

If the desired circle has the same centre as the reference circle, the auxiliary circle thus calculated will also be the desired circle. If the desired circle has a centre other than that of the reference circle, it is still necessary to calculate the desired circle from the auxiliary circle. To achieve this, a further embodiment of the device in accordance with the invention is characterized in that the arithmetic means are also operative to calculate the coordinates X' and Y' of the desired circle in conformity with the formules: $X'=X+(X_1-X_0)$ and $Y'=Y+(Y_1-Y_0)$.

BRIEF DESCRIPTION OF THE DRAWING

These and other aspects of the invention will be described hereinafter with reference to the drawing, wherein.

DETAILED DESCRIPTION OF THE PREFERRED EMBODIMENT

Figure 1:
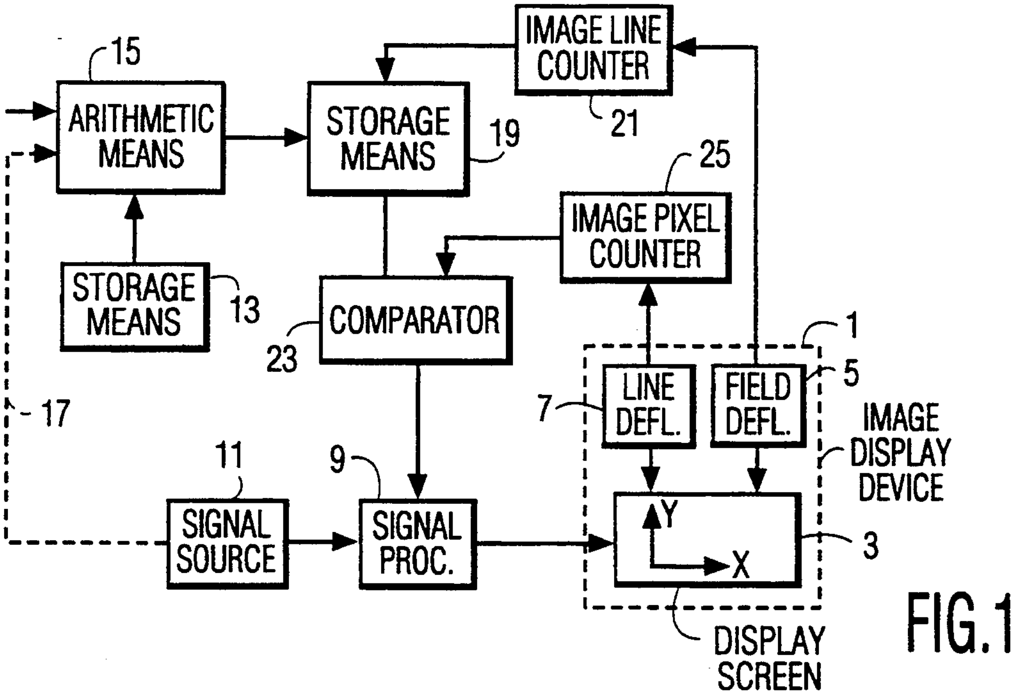
FIG. 1 shows a block diagram of an embodiment of a device in accordance with the invention.

The device shown in FIG. 1 comprises a known image display device 1, for example a monitor comprising a display screen 3, field deflection means 5 and line deflection means 7. The display screen 3 may form part of, for example a picture tube or may be an LCD display screen. A rectangular system of coordinates having an X-axis and an Y-axis is associated with the display screen 3. In order to form an image on the display screen 3, it is scanned in a customary manner in a pattern of image lines which extend parallel to the X-axis and which satisfy the equation $y=Y_L$, $Y_l$ having a different value for each image line so that all image lines together fill the entire display screen. The line deflection means 7 serve to vary the x-coordinate of a pixel formed on the display screen 3 and the field deflection means 5 serve to vary the y-coordinate. The brightness of the pixel depends on a brightness signal from a signal processing circuit 9 which is connected to a signal source 11 (denoted by a dashed line), for example an X-ray image intensifier-television chain.

The information originating from the signal source 11 can be displayed in the form of an image on the display screen 3. Should this image be circular, as is the case for example in the event of an X-ray image intensifier, it is desirable that the part of the (rectangular) display screen 3 which is situated around this image remains dark so as to prevent the observation of the actual image from being impeded by disturbing light from the surrounding edge region. The brightness of the pixels situated outside this circular region, therefore, should preferably be equal to zero. Therefore, it is desirable to generate an image of a black, rectangular surface comprising a circular opening which can be displayed on the display screen 3 simultaneously with the image originating from the signal source 11. Sometimes it is also desirable to mark in the image of the display screen 3 a circular region which is of special importance or in which special measurements are to be performed. In all above cases it is desirable to generate a circular image which can be displayed on the display screen 11 together with the information originating from the signal source 11. The radius, and possibly the centre of this circle, should be adjustable as desired.

The device shown in FIG. 1 comprises means for satisfying this requirement in a simple and inexpensive manner. The device comprises first storage means 13 for storing the coordinates of a reference circle having a predetermined centre $M_0$ and a predetermined radius $R_r$. The storage means 13 preferably comprise a nonvolatile memory, for example a ROM or an EPROM, in which the data of the reference circle is permanently stored. The storage means 13 are connected to arithmetic means 15 which may comprise, for example a microprocessor of the type 8031, and which are operative to calculate the coordinates of the desired circle. To this end, the arithmetic means 15 can receive on the one hand the data concerning the radius R and the centre $M_1$ of the desired circle and can on the other hand fetch the data concerning the reference circle from the first storage means 13. The data concerning the desired circle can be input, for example manually via a keyboard (not shown), or may originate from the signal source 11 as denoted by the dashed connection 17.

The coordinates of the desired circle as calculated by the arithmetic means 15 can be stored in second storage means 19. The second storage means 19 preferably comprise one or more RAM-type memories in which the y-coordinates of the desired circle act as an address and the associated x-coordinates are stored as data. The addresses (y-coordinates) required for reading out the data (x coordinates) stored in the second storage means 19 are supplied by an image line counter 21 which receives a signal from the field deflection means 15 and calculates the coordinate $Y_L$ of the scanned image line therefrom. In response thereto, the second storage means 19 apply the values of the x-coordinates, associated with $Y_L$, of the desired circle to a first input of a comparator circuit 23, a second input of which is connected to the output of a pixel counter 25 which receives a signal from the line deflection means 7 and which calculates therefrom the value of the x-coordinate of each pixel formed. The comparator circuit 23 compares the values of the x-coordinate, associated with the scanned image line $y=Y_L$, with the x-coordinates of the pixels formed and generates an output signal at the instant at which these x-coordinates become equal. The output signal is applied to the signal processing circuit 9 which generates a control signal for the monitor 1.

Figure 2:
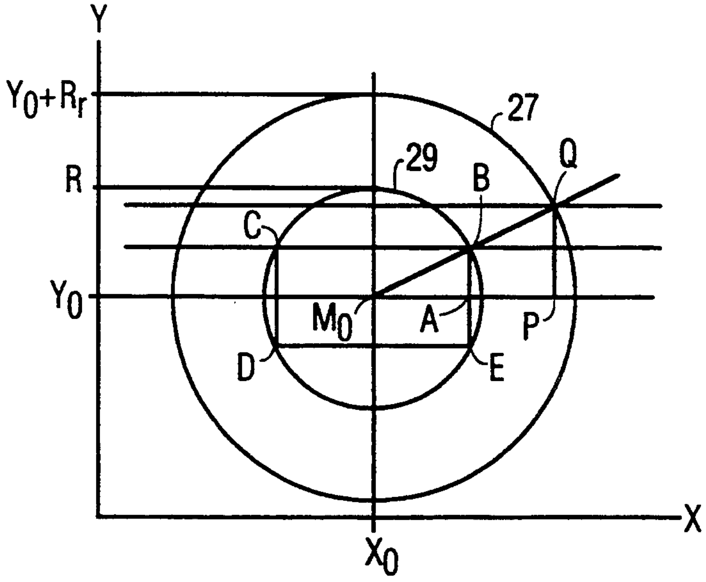
FIGS. 2 and 3 show diagrams illustrating calculations which can be performed by means of the device in accordance with the invention.

The calculation of the coordinates of the desired circle on the basis of the data concerning the reference circle and the radius of the desired circle will be illustrated with reference to FIG. 2. This Figure shows a rectangular system of coordinates, having an X-axis and an Y-axis, and a reference circle 27 having a radius $R_r$ and a centre $M_0(X_0, Y_0)$. The coordinates of all points on the reference circle 27 can be calculated by means of the circle equation:

$$X_r - X_0 = \pm R_r \sqrt{1 - \left[\frac{(Y_r - Y_0)}{R_r}\right]^2}$$

This calculation is rather time-consuming, because the calculation of the square root is time-consuming. However, if the result of the calculation is stored in a non-volatile memory, the calculation need be executed only once, after which the result will be available at all times.

Once the data concerning the reference signal 27 is available, it is comparatively simple to calculate the coordinates of an auxiliary circle 29 having the same centre $M_0(X_0, Y_0)$ and a radius R which may be deviate from the radius $R_r$. For the triangles $M_0PQ$ and $M_0AB$ shown in the Figure:

$$AB/R=PQ/R_r \text{ and } M_0A/R=M_0P/R_r \quad (1)$$

If the point Q on the reference circle has the coordinates $X_r$, $Y_r$ and the point B on the auxiliary circle to be calculated has the coordinates X, Y:

$$M_0P=X_r-X_0 \quad PQ=Y_r-Y_0 \quad X=X_0+M_0A \quad Y=Y_0+AB \quad (2)$$

Via simple reduction it follows from (1) and (2) that:

$$Y=(R/R_r)*(Y_r-Y_0)+Y_0 \quad (3)$$

$$X=(R/R_r)*(X_r-X_0)+X_0 \quad (4)$$

For the calculation of X and Y according to (3) and (4) only the standard functions (addition, subtraction, multiplication and division) are required, so that these calculations can be performed very rapidly by the arithmetic means 15. The calculations are even faster when the equation (3) is rewritten so that $Y_r$ is calculated from a given value of Y:

$$Y_r=(R_r/R)*(Y-Y_0)+Y_0 \quad (3')$$

It is now possible to vary Y from −R to +R and to calculate, for each value of Y, the associated value of $Y_r$ by means of (3'). When this value of $Y_r$ is used as the address, the value of $X_r$ stored at the address $Y_r$ can be read from the first storage means 13. Subsequently, the value of X associated with Y can be calculated by means of (4).

The calculations described in the foregoing paragraph can be further simplified (and hence accelerated) by choosing the coordinate system so that the centre $M_0$ of the reference circle 27 is coincident with the origin of the coordinate system. In that case, $X_0$ and $Y_0$ equal 0, so that (3') and (4) become:

$$Y_r=(R_r/R)*Y \quad (5)$$

$$X=(R/R_r)*X_r \quad (6)$$

For the foregoing it has been assumed that the coordinates of each point of the reference circle 27 are stored in the first storage means 13. However, this is not necessary. It is sufficient to store merely the coordinates of one quadrant (for example, the top right quadrant in FIG. 2) and to calculate the coordinates of the corresponding quadrant of the auxiliary circle 29 therefrom in the described manner. The coordinates of the other quadrants can then be simply found by mirroring the calculated x-coordinates relative to the line $x=X_0$ and by mirroring the calculated y-coordinates relative to the line $y=Y_0$. Thus, the points $C(X_0-X,Y_0+Y)$, $D(X_0-X,Y_0-Y)$, and $E(X_0+X,Y_0-Y)$ are obtained from the point $B(X_0+X,Y_0+Y)$.

Figure 3:
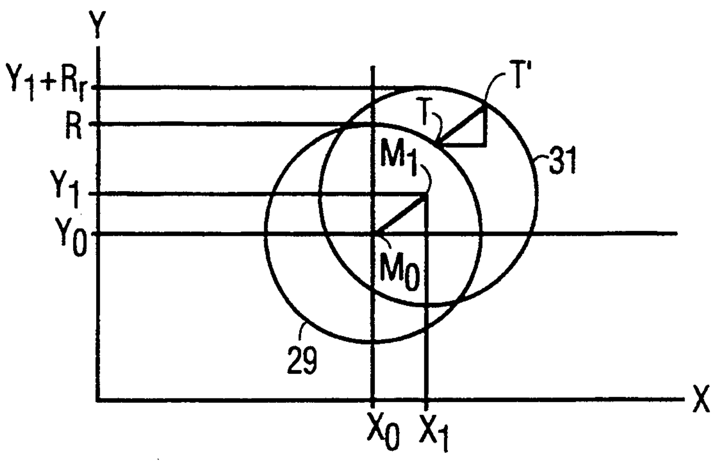

If the desired circle is to have the same centre as the reference circle 27, the auxiliary circle 29 calculated in the described manner is at the same time the desired circle. However, it may be that the desired circle has a centre other than that of the reference circle 27. In that case the coordinates of the desired circle can be simply found as will yet be described with reference to FIG. 3. This Figure shows the calculated auxiliary circle 29, having the centre $M_0(X_0, Y_0)$, and the desired circle 31, having the centre $M_1(X_1, Y_1)$. Both circles have the same radius R. The Figure directly shows that the coordinates X' and Y' of an arbitrary point T' on the desired circle 31 can be calculated from the coordinates X and Y of the corresponding point T on the auxiliary circle in conformity with the formules: $X'=X+(X_1-X_0)$ and $Y'=Y+(Y_1-Y_0)$. The entire auxiliary circle 29 is thus shift to the position of the desired circle 31. The coordinates of the auxiliary circle 29 and the desired circle 31 can be stored in separate sections of the second storage means 19; there may also be provided separate storage means (not shown) for the storage of the coordinates of the auxiliary circle 29, so that the entire second storage means 19 are available for the coordinates of the desired circle 31. Evidently, it is also possible to shift the reference circle 27 to the desired position before commencing the calculation described with reference to FIG. 2. In that case the coordinates of the shifted reference circle should be stored in a suitable memory before the circle having the radius R is calculated therefrom. However, this calculation then directly produces the desired circle.

I claim:

1. A device for forming an image bounded by a desired circle of radius R on a display screen (3), comprising means (5, 7) for scanning the display screen in a pattern of parallel image lines, each image line extending in conformity with the equation $y=Y_L$ in a rectangular system of coordinates associated with the display screen and having an X-axis and an Y-axis, $Y_L$ having a different value for each image line, and also comprising means for forming an output signal at any instant at which an image line intersects the circumference of the desired circle (31) of radius R bounding the image to be formed, characterized in that the device also comprises:

a) first storage means (13) for storing pairs of coordinates $X_r$, $Y_r$ of at least one quadrant of a reference circle (27) having a predetermined center $M_0(X_0, Y_0)$ and a predetermined radius $R_r$ in manner that for each stored pair of coordinates $X_r$, $Y_r$, one coordinate of the pair acts as an address and the other coordinate of the pair is stored at the address;

b) arithmetic means (15) for calculating the coordinates X' and Y' of the desired circle (31) from the coordinates $X_r$, $Y_r$ of the reference circle (17) obtained from the first storage means and given values of the radius R and the coordinates $X_1$, $Y_1$ of the centre $M_1$ of the desired circle;

c) second storage means (19) for storing the calculated values of X' and Y', the values of Y' acting as addresses, the associated values of X' being stored at each address Y' and;

d) comparison means (23) for comparing, during the scanning of the display screen (3), x-coordinates followed during the formation of each image line $y=Y_L$ with the value X' associated with $Y'=Y_L$ and stored in the second storage means, and for generating an output signal at the instant at which $x=X'$.

2. A device as claimed in claim 1, characterized in that the first storage means (13) comprise a non-volatile memory.

3. A device as claimed in claim 1, characterized in that the arithmetic means (15) are operative to calculate the coordinates X and Y of an auxiliary circle (29), having the same centre $M_0(X_0, Y_0)$ as the reference circle (27) and a radius R, by executing the following calculations for each value of Y between 0 and R in said quadrant:

1) calculation, for each value of Y, of an associated value of $Y_r$ in conformity with the formule: $Y_r=(R_r/R)*Y$;

2) reading of the value $X_r$ stored at the address $Y_r$ in the first storage means (13);

3) calculation of the value of X associated with Y in conformity with the formule: $X=(R/R_r)*X_r$;

4) calculation, if necessary, of the corresponding values of X and Y in the other quadrants by mirroring the values of X relative to the line $x=X_0$ and by mirroring the values of Y relative to the line $y=Y_0$.

4. A device as claimed in claim 3, characterized in that the arithmetic means are also operative to calculate the coordinates X' and Y' of the desired circle (31) in conformity with the formulas: $X'=X+(X_1-X_0)$ and $Y'=Y+(Y_1-Y_0)$.

5. A device as claimed in claim 3, characterized in that the first storage means (13) comprise a non-volatile memory.

6. A device as claimed in claim 5, characterized in that the arithmetic means are also operative to calculate the coordinates X' and Y' of the desired circle (31) in conformity with the formulas: $X'=X+(X_1-X_0)$ and $Y'=Y+(Y_1-Y_0)$.

* * * * *